United States Patent
Ismail (10) Patent No.: US 9,363,201 B2
(45) Date of Patent: ***Jun. 7, 2016

(54) METHOD AND APPARATUS FOR ALLOCATING CLIENT RESOURCES TO MULTIPLE APPLICATIONS

(71) Applicant: TVWorks, LLC, Philadelphia, PA (US)

(72) Inventor: Labeeb K. Ismail, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,349

(22) Filed: Jan. 6, 2015

(65) Prior Publication Data

US 2015/0319105 A1    Nov. 5, 2015

Related U.S. Application Data

(63) Continuation of application No. 10/788,099, filed on Feb. 26, 2004, now Pat. No. 8,965,936.

(51) Int. Cl.

| | |
|---|---|
| G06F 17/30 | (2006.01) |
| H04L 12/911 | (2013.01) |
| H04L 29/08 | (2006.01) |
| H04L 12/26 | (2006.01) |
| G06F 9/50 | (2006.01) |
| H04N 5/76 | (2006.01) |
| H04N 7/16 | (2011.01) |
| H04N 21/4147 | (2011.01) |
| H04N 21/426 | (2011.01) |
| H04N 21/4335 | (2011.01) |
| H04N 21/442 | (2011.01) |
| H04N 21/6543 | (2011.01) |

(52) U.S. Cl.
CPC ............ *H04L 47/827* (2013.01); *G06F 9/5016* (2013.01); *H04L 43/16* (2013.01); *H04L 47/822* (2013.01); *H04L 67/1097* (2013.01); *H04N 5/76* (2013.01); *H04N 7/165* (2013.01); *H04N 21/4147* (2013.01); *H04N 21/42661* (2013.01); *H04N 21/4335* (2013.01); *H04N 21/4424* (2013.01); *H04N 21/6543* (2013.01); *G06F 17/30135* (2013.01); *G06F 17/30147* (2013.01); *G06F 2209/5014* (2013.01)

(58) Field of Classification Search
CPC .......... G06F 2209/5014; G06F 9/5016; G06F 17/30147; G06F 17/30135; G11B 27/329; H04N 21/4147; H04N 21/4424; H04N 21/6543; H04L 67/1097; H04L 47/822; H04L 43/16
USPC ......................................................... 707/812
See application file for complete search history.

(56) References Cited

U.S. PATENT DOCUMENTS

| | | |
|---|---|---|
| 4,402,041 A | 8/1983 | Clark |
| 5,713,013 A | 1/1998 | Black |
| 5,897,661 A | 4/1999 | Baranovsky et al. |
| 6,751,168 B2 | 6/2004 | Yamada |

(Continued)

OTHER PUBLICATIONS

International Search Report in corresponding PCT/US05/00286 dated Aug. 29, 2006.

*Primary Examiner* — Thanh-Ha Dang
(74) *Attorney, Agent, or Firm* — Banner & Witcoff, Ltd.

(57) ABSTRACT

A quota management system for Personal Video Recorders (PVRs) in which the storage space available on connected storage devices is shared between multiple content providers or multiple software programs.

20 Claims, 10 Drawing Sheets

(56) References Cited

U.S. PATENT DOCUMENTS

| | | | |
|---|---|---|---|
| 6,782,462 B2 | 8/2004 | Marion et al. | |
| 6,795,830 B1 | 9/2004 | Banerjee et al. | |
| 7,093,088 B1 | 8/2006 | Todd et al. | |
| 7,272,674 B1 | 9/2007 | Nandi et al. | |
| 7,840,644 B2 | 11/2010 | Yuzawa | |
| 7,962,011 B2 | 6/2011 | Plourde, Jr. et al. | |
| 2002/0136099 A1 | 9/2002 | Yamada | |
| 2003/0084151 A1* | 5/2003 | Simpson | G06Q 10/02 709/225 |
| 2003/0110513 A1 | 6/2003 | Plourde et al. | |
| 2003/0140158 A1 | 7/2003 | Lee et al. | |
| 2003/0172049 A1 | 9/2003 | Choy et al. | |
| 2003/0220949 A1* | 11/2003 | Witt, Jr. | G06F 11/1446 |
| 2004/0002987 A1 | 1/2004 | Clancy et al. | |
| 2004/0101271 A1 | 5/2004 | Boston et al. | |
| 2004/0107325 A1 | 6/2004 | Mori | |
| 2004/0268407 A1 | 12/2004 | Sparrell et al. | |
| 2005/0005300 A1 | 1/2005 | Putterman et al. | |
| 2005/0010620 A1 | 1/2005 | Silvers et al. | |
| 2005/0030575 A1 | 2/2005 | Fujiwara | |
| 2005/0033757 A1 | 2/2005 | Greenblatt et al. | |
| 2005/0050577 A1 | 3/2005 | Westbrook et al. | |
| 2005/0091221 A1 | 4/2005 | Harris et al. | |
| 2005/0102385 A1* | 5/2005 | Muhonen | H04H 20/57 709/223 |
| 2005/0129042 A1* | 6/2005 | Muhonen | H04H 20/40 370/412 |
| 2005/0193021 A1 | 9/2005 | Peleg | |
| 2005/0193413 A1 | 9/2005 | Ellis et al. | |
| 2005/0207380 A1 | 9/2005 | Blasco Claret et al. | |
| 2006/0095705 A1* | 5/2006 | Wichelman | G06F 3/0605 711/171 |
| 2006/0130094 A1 | 6/2006 | Lockridge | |
| 2006/0282869 A1 | 12/2006 | Plourde | |
| 2009/0074380 A1 | 3/2009 | Boston et al. | |
| 2009/0158375 A1 | 6/2009 | Rodriguez et al. | |
| 2009/0182847 A1* | 7/2009 | Suzuki | G11B 27/329 709/219 |
| 2012/0174178 A1* | 7/2012 | Ryal | H04N 5/76 725/119 |

* cited by examiner

METHOD AND APPARATUS FOR ALLOCATING CLIENT RESOURCES TO MULTIPLE APPLICATIONS

CROSS REFERENCE TO RELATED APPLICATIONS

This application is a continuation of and claims priority to co-pending U.S. application Ser. No. 10/788,099, filed Feb. 26, 2004, having the same title, which content is incorporated herein by reference in its entirety.

BACKGROUND OF THE INVENTION

1. Field of the Invention

The present invention relates to data processing systems and, more particularly, resource management within a client device such as in personal video recorder.

2. Description of the Related Art

In current generation personal video recorders (PVRs), the storage space available is dedicated to the main (effectively only) application running on the PVR platform; namely, the storage of received content for subsequent viewing. Unfortunately, the dedication of substantially all resources to a single application impedes service and feature expansion, thereby decreasing the value of a PVR to a user.

SUMMARY OF INVENTION

These and other deficiencies of the prior art are addressed by the present invention of a quota management system for Personal Video Recorders (PVRs) in which the storage space available on connected storage devices is shared between multiple content providers or multiple software programs. The quota system controls the use of storage space for recording television programs by multiple software applications from one or more vendors. A method for adapting a resource allocation according to one embodiment of the invention comprises: receiving, from a server, a provisioning request including resource allocation parameters associated with at least one application, said resource allocation parameters indicative of a resource allocation for said at least one application; identifying available resources; and reserving available resources for said at least one set of applications according to said resource allocation parameters.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be described within the context of a quota management system for Personal Video Recorders (PVRs) in which the storage space available on connected storage devices is shared between multiple content providers or multiple software programs. The quota system controls the use of storage space for recording television programs by multiple software applications from one or more vendors.

In one embodiment, a central entity such as a cable operator or PVR service provider (e.g., a server) controls the use of the storage space by multiple applications based on the quota system. Different vendors providing content to the user through the PVR gain permission from this service provider to reserve memory space or to use a general area (or other PVR resources). In one embodiment, the invention provides a method and apparatus to share and/or reserve the storage space in multiple AV hard drives connected to a PVR.

Figure 1:
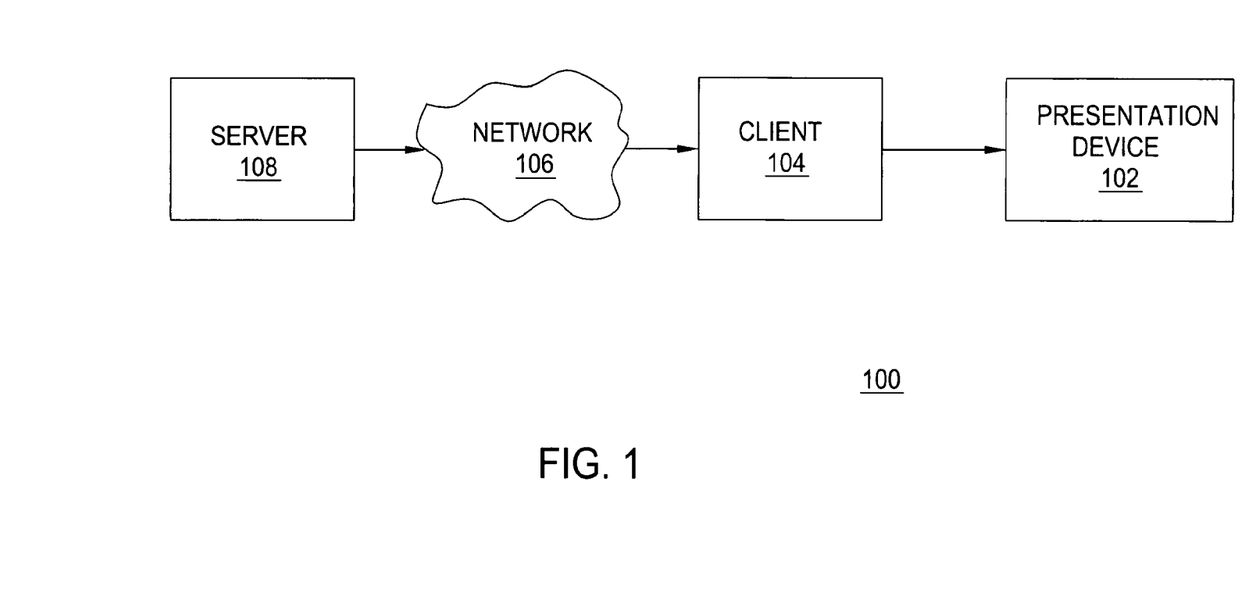
FIG. 1 depicts a high-level block diagram of an information distribution system suitable for use with the present invention.

FIG. 1 depicts a high-level block diagram of an information distribution system suitable for use with the present invention. A client computer or set top box (STB) 104 is connected to a presentation device 102 such as a television or other audiovisual display device or component(s). The client computer or set-top box 104 may also comprise a personal video recorder (PVR) such as described below with respect to FIG. 2. The connection between client computer 104 and presentation device 102 allows client computer 104 to tune and/or provide a presentation signal (e.g., a television signal) to presentation device 102. The presentation device may be connected to the client device through a home network. The output of the client computer may be further processed by the presentation device before presentation. The functions of the presentation device may be distributed across multiple devices.

Client 104 is also connected to a communication system 106. In one embodiment, communication system 106 includes a telephone network and the Internet. In other embodiments, communication system 106 could include a network, the Internet without a telephone network, a dedicated communication system, a cable or satellite network, a single connection to another computer or any other means for communicating with another electronic entity. The communication system 106 is also connected to a server 108, such as a Unix or Windows server computer or a broadcast head-end.

The inventors contemplate that the system 100 may be logically segmented into a server function and a client function. The various functions may be implemented as a method by one or more processors. The functions may be embodied as software instructions within a signal bearing medium or a computer product. Within the context of a peer to peer network, the server functions and client functions may both be implemented on client and/or server devices.

Figure 2:
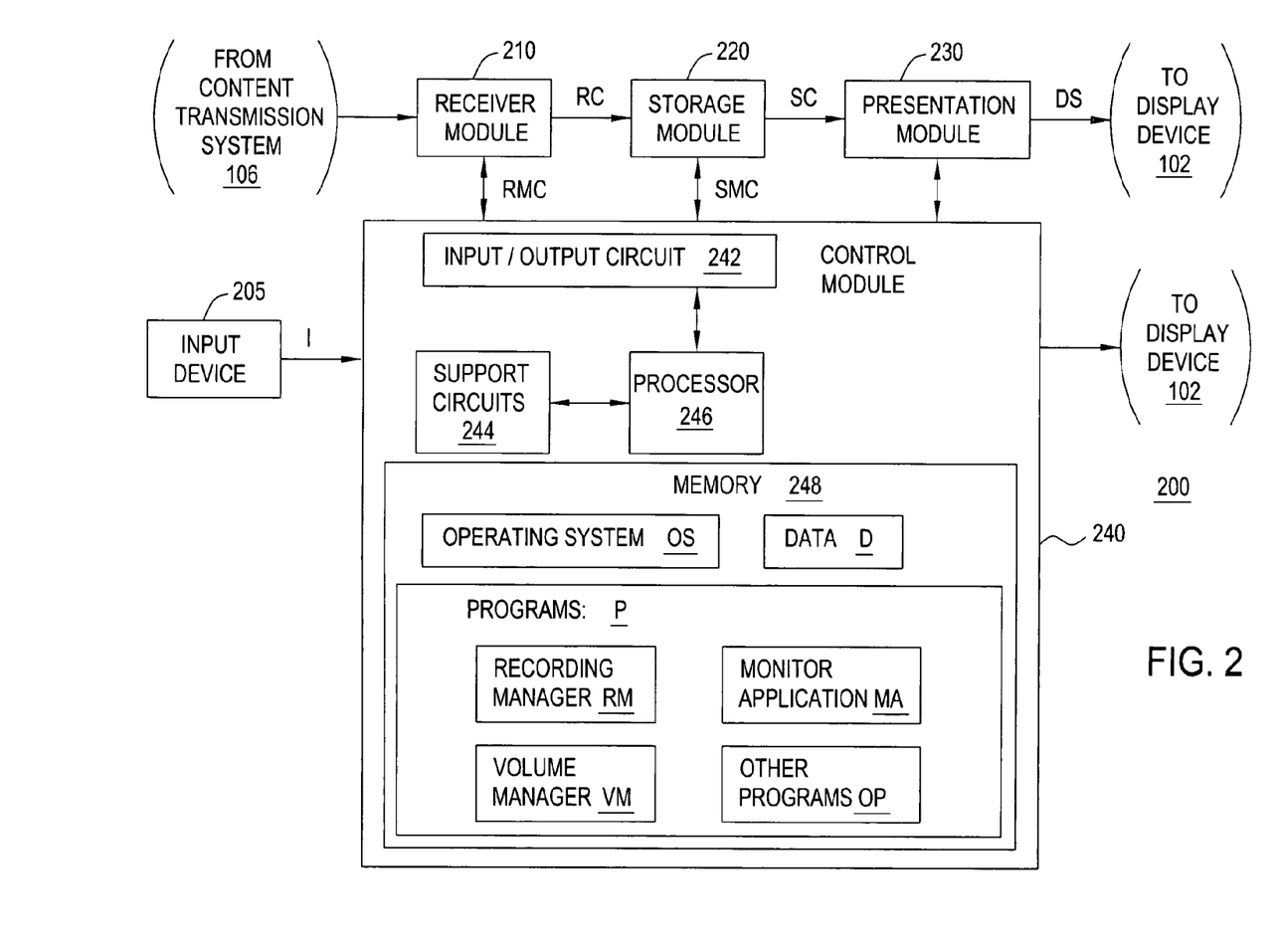
FIG. 2 depicts a high level block diagram of a personal video recorder (PDR) suitable for use in the information distribution system 100 of FIG. 1.

FIG. 2 depicts a high level block diagram of a personal video recorder (PVR) suitable for use in the information distribution system 100 of FIG. 1. Specifically, the PVR 200 of FIG. 2 may be employed to implement the client device 104 discussed above with respect to FIG. 1. The PVR 200 of FIG. 2 comprises an input device 105, a receiver module 210, a storage module 220, a presentation module 230, and a control module 240.

The receiver module 210 receives television programs, applications and other content from a content transmission system such as the network 106 discussed above with respect to FIG. 1. The receiver module 210 includes all of the circuitry necessary to implement at least one of analog television reception, digital television reception, and data reception. The receiver module 210 is controlled by the control module 240 via a receiver module control signal RMC. The receiver module 210 and control module 240 communicate with each other to effect desired content selections, channel selections and the like. The receiver module 210 provides selected received content to RC the storage module 220. The received content provided to the storage module 120 may comprise compressed content, decompressed content, data and the like.

The storage module 220 comprises one or more mass storage devices for storing received content RC provided by the receiver module 210. The storage module 220 may comprise a single mass storage device, a plurality of mass storage devices, an array of mass storage devices, and the like. The storage module 220 is controlled by the control module 240 via a storage module control signal SMC. The storage module 220 and control module 240 communicate with each other to effect desired logical and physical partitioning of the one or more mass storage devices, selection of compression/decompression formats and other operating details associated with the storage and retrieval of content from the mass storage device(s).

The presentation module 230 processes a stored content stream SC provided by the storage module 220 to produce a display signal DS suitable for use by a presentation device, such as a television monitor, computer display device and the like. For example, in the case of the storage module providing a compressed digital video stream (and associated audio streams), the presentation module 230 includes appropriate decompression/decoder circuitry along with presentation circuitry such that a correctly formatted display stream DS is provided to the display device. The display stream DS may comprise a National Television Standards Committee (NTSC) analog display signal, a digital display signal or any other signal format as desired, depending upon the type of display device utilized. The presentation module 230 is controlled by the control module 240 via a presentation module control signal PMC. The presentation module 230 and control module 240 communicate with each other to effect desired decompression/deencryption processing, format processing, image processing and other functions associated with processing the stored content stream SC to produce the display signal DS.

The control module 240 comprises a processor 246 as well as memory 248 for storing programs P and data D. The memory 248 may also store an operating system OS supporting the programs P. The processor 246 cooperates with conventional support circuitry such as power supplies, clock circuits, cache memory and the like, as well as circuits that assist in executing the software routines stored in the memory 248. As such, it is contemplated that some of the steps discussed herein as software processes may be implemented within hardware, for example as circuitry that cooperates with the processor 246 to perform various steps. The control module 240 also contains input/output (I/O) circuitry 242 that forms an interface between the various' functional elements communicating with the control module 240.

Although the control module 240 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The control module 240 may be operably coupled to a number of devices or systems. For example, the I/O circuitry 242 in FIG. 2 is depicted as interfacing to an input device 205 (e.g., a keyboard, mouse, remote control and the like), a network (e.g., communication system 106), a display device (e.g., presentation device 102), a receiver module 210, a storage module 220 and a presentation module 230.

Various embodiments of the invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

Generally speaking, the Personal Video Recorder (PVR) of FIG. 2 comprises functional modules adapted to receive television signals (in either analog form or digital form), and process, encode and store the signals as digital data on one or more storage devices and modules. The PVR 200 is adapted to play back the stored television program by accessing the stored data from the storage devices, decoding and presenting the stored data in audio/visual form. In addition to these modules, the PVR 200 includes an operating system or an environment to execute software programs such as a Java Virtual Machine. The PVR uses the input device 105 to collect response from the user and may contain (or may be connected to) a display device where software programs can present screens visible to users.

The Recording Manager RM is a module that accepts requests from software programs to record television programs. The recording requests may be for television programs being broadcast at the time of the request or for television programs to be recorded in the future. The recording manager stores these requests and initiates the recording at the specified start time and stops the recording after the requested duration of the program has been recorded.

The Volume Manager VM is a module that maintains information about various quotas and reservations for space management. In one embodiment, the Volume Manager enforces quotas by using Logical Volumes. A Logical Volume is a container to store, for example, recorded television programs. A Quota is a limiting value that specifies the maximum amount of storage space that can be used for storing recorded programs in the Logical Volume. For example a Quota value of 5 GB for a Logical Volume, means the total amount of space used for all the recorded programs in that Logical Volume should not exceed 5 GB at any time. A Reservation is a value that specifies the minimum amount of space that is guaranteed to be available in a Logical Volume to store recorded programs. For example a Reservation value of 2 GB for a Logical Volume means that there would be at least 2 GB of storage space that will be available on the Logical Volume to store recorded programs.

The Monitor Application MA is a software program with special access rights that is authorized by the PVR service provider to control various functions of the PVR. The Monitor Application MA optionally communicates with a server (e.g., server 108) to collect parameters supporting its functionality. The Monitor Application has permission to create Logical volumes, Modify or Delete Logical Volumes created by other software programs.

The Monitor application also has permissions to change or remove Reservation values for Logical Volumes. The Monitor application also has permissions to change, set or remove Quota values for Logical Volumes. When an application requests the Volume Manager to reserve space on a Logical Volume, the Volume Manager checks with the Monitor Application before allowing the request by invoking a module within the Monitor Application. The Monitor Application may grant or deny the request to reserve space.

The Monitor Application MA uses Allocation Provisioning Information to decide whether a request from an application to reserve space in a storage device should be granted or not. If the request is granted, the VM then decides the amount of space granted based on the value specified by the Monitor Application. Monitor Application also uses Allocation Provisioning Information to set Quotas on Logical Volumes.

Allocation Provisioning Information may be provided in various forms. In one form, the Allocation Provisioning Information specifies that any software programs could reserve any amount of space on any storage device and, if space is available in that device, to grant the reservation.

In another form, the Allocation Provisioning Information identifies multiple groups of software programs that are allowed to make reservations and the maximum value allowable for each group. In this form combined value for all reservations from programs belonging to a group should not exceed the specified maximum value. In this case the group of software programs may be specified as software programs with a specified value of an associated attribute tag. The tag comprises, in various embodiments, a data structure such as one or more bits, a database entry, a group or program identifier and the like.

In another form, the Allocation Provisioning Information identifies multiple groups of software programs that are allowed to create Logical Volumes and the quota values to be set for these Logical Volumes.

In another form, the Allocation Provisioning Information is a function of the storage space available on the PVR (e.g. percentage of total or available storage space), characteristics of the subscriber (e.g., premium or standard) of the PVR Service, or characteristics of the software program (e.g., preferred or standard) that requests the reservation. In another form, the Allocation Provisioning Information is retrieved from a server connected to the PVR through a communication network (e.g., server management of subscriber PVR).

The interactions between software programs, the recording manager, the volume manager and the monitor application will now be discussed in more detail.

Figure 3A:
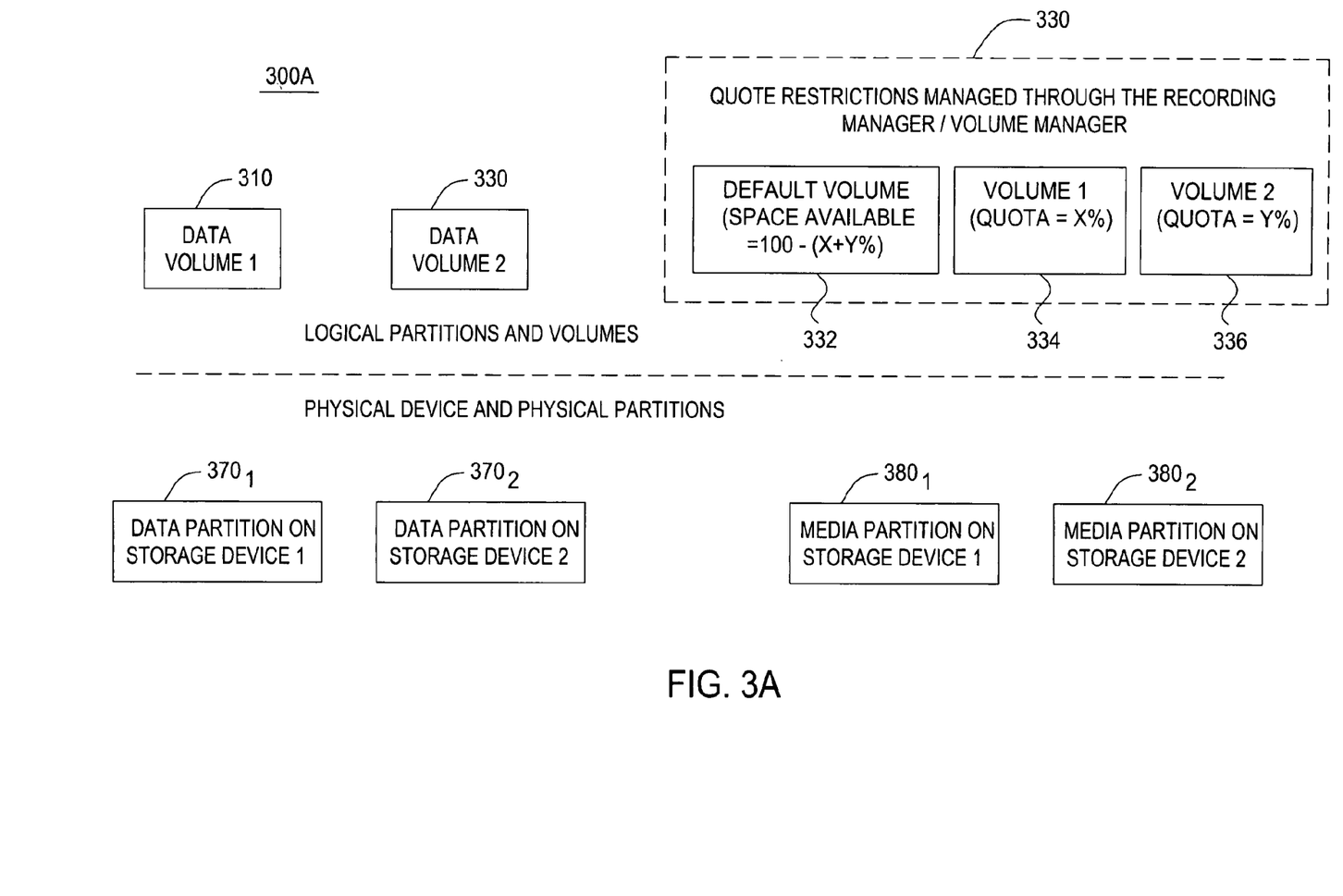
FIGS. 3A and 3B graphically depict models of management methods according to various embodiments of the invention.

FIGS. 3A and 3B graphically depict models of management methods according to various embodiments of the invention. Specifically, and referring to FIG. 3A, the model 300A is divided into a first group of functional elements denoted as logical partitions and volumes, and a second group of functional elements denoted as physical devices and physical partitions. The logical partitions and volumes comprise a first data volume 310, a second data volume 320 and a quota restriction manager 330. The quota restriction manager 330 is used to manage quota restrictions and may be implemented via the recording manager and/or the volume manager. The quota restriction manager 330 provides management of default volume space 332, first volume space 334 and second volume space 336. The first volume space 334 is set equal to a quota of X %. The second volume space 336 is set equal to a quota of Y %. The default volume space is set equal to 100% minus (X+Y) %.

The Default Volume is a designated one of the Logical Volumes in a storage device. The space available on the Default Volume is the space remaining on the storage device after reservations on all other Logical Volumes on that storage device are enforced. In one embodiment of the invention, the Volume Manager creates the default volume on each of the connected storage devices. In this model the Logical Volumes may be distributed across multiple physical partitions on multiple storage devices.

The physical device and physical partitions portion comprises one or more hard disk drives which, either individually or in any combination, support a plurality of data partitions (illustratively two) denoted as $370_1$ and $370_2$, as well as a plurality of media partitions (illustratively two) denoted as $380_1$ and $380_2$. It is noted that the data partitions 370 and media partitions 380 may be stored on individual hard disks in their entireties and/or have portions stored on or across multiple hard disks or mass storage devices.

Figure 3B:
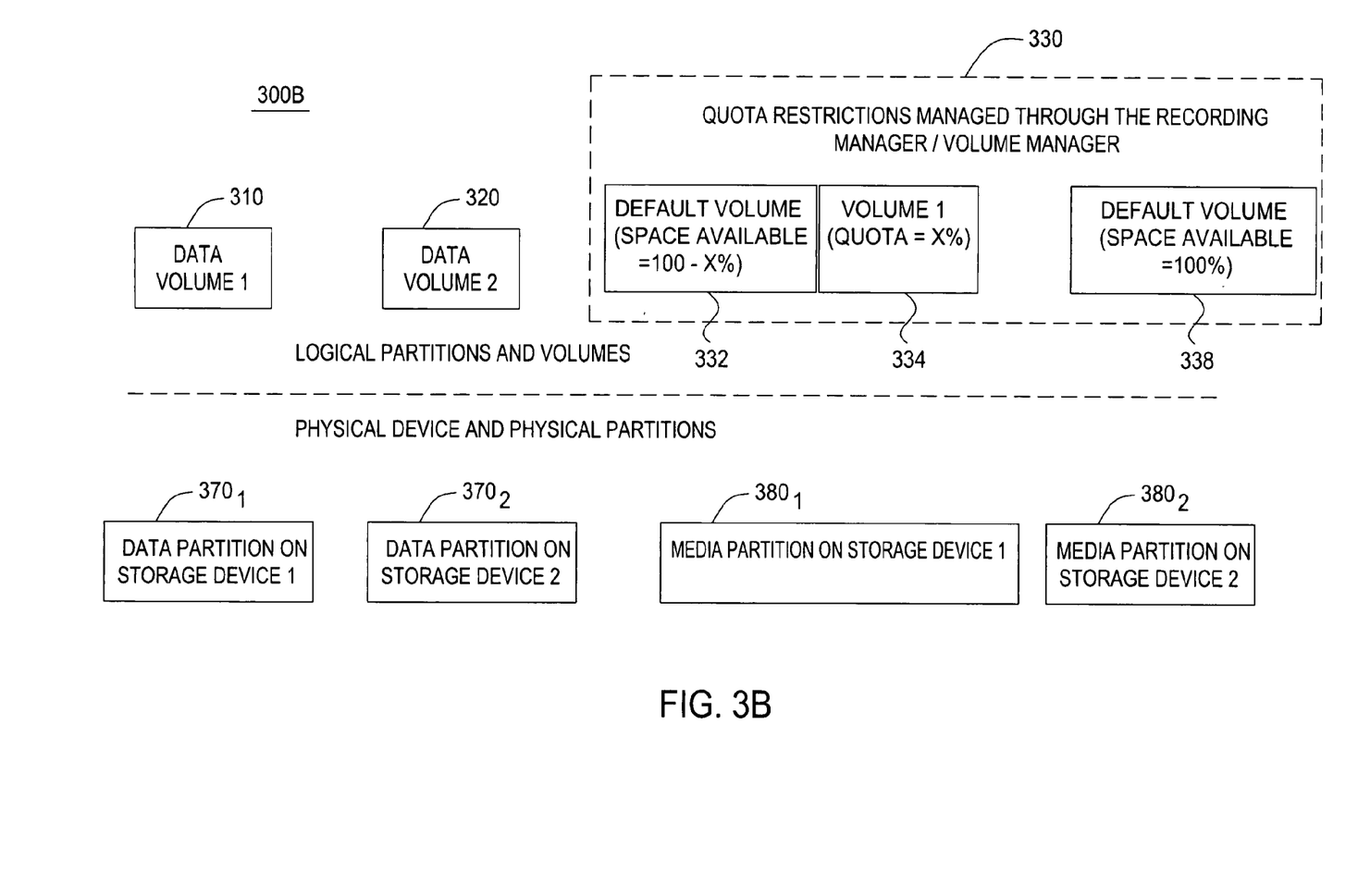

FIG. 3B depicts a model 300B similar to the model 300A discussed above with respect to FIG. 3A. Specifically, the model 300B of FIG. 3B includes the data volumes 310, 320, data partitions 370 and media partitions 380 as discussed above. However, the quota restriction manager 330 is configured differently in the model 300B. Specifically, the quota manager 330 of the model 300B comprises a first volume 334 having a quota of X % and a default volume 338 having available space of 100%. The default volume 332 has available space of 100%–X %. In this model each Logical Volume is fully contained within a physical partition.

In the models 300A and 300B of FIG. 3, data partitions (370) and media partitions (380) visible to applications are accessed through general purpose file system APIs, such as java.io.File. In one embodiment, the PVR Service provider requires all PVRs to have a specified percentage of the total storage capacity available to store non-media files. The PVR service provider may also enforce a requirement that specifies that a given percentage of storage space in each storage device connected to the PVR is available to store non-media files. In both of these cases, the remainder of the storage space is available to store media content. The space available for storing media files on the PVR may be spread across multiple hard-disks or other mass storage devices.

Figure 4A:
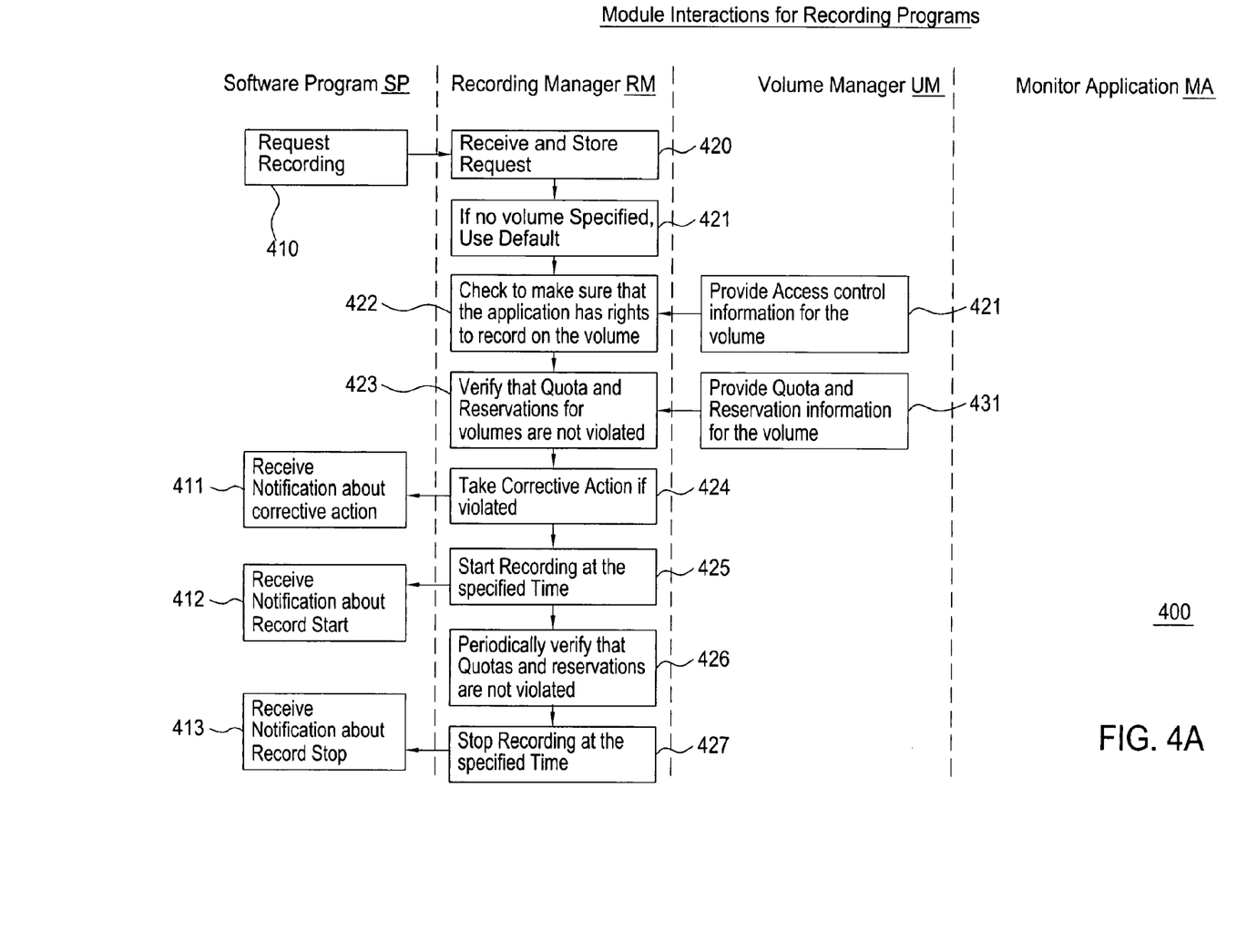
FIGS. 4A and 4B graphically depict flow diagrams of interactions between the various functional elements invoked according to an embodiment of the present invention.
Figure 4B:
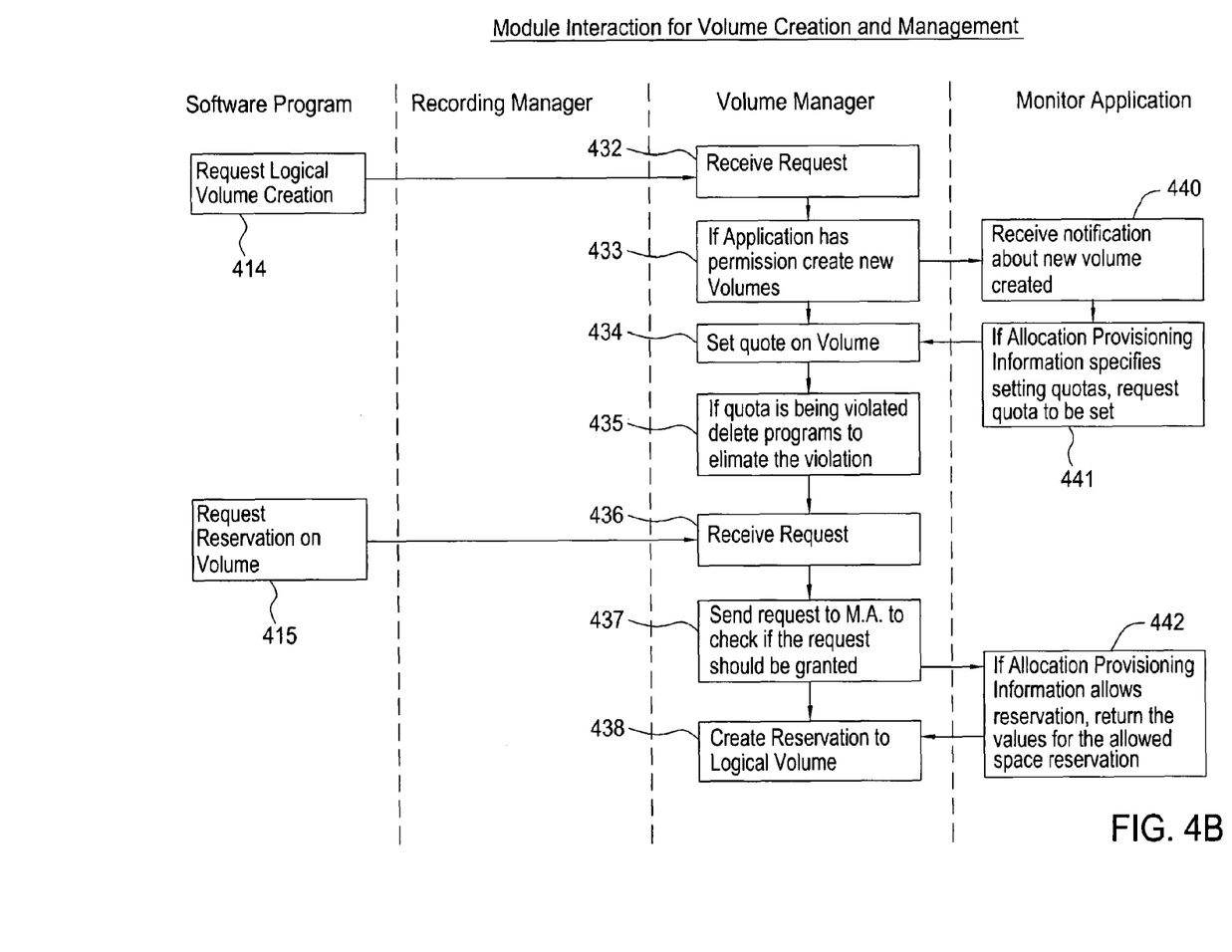

FIGS. 4A and 4B graphically depict flow diagrams of interactions between the various functional elements invoked according an embodiment to the present invention. Specifically, the flow diagrams of FIGS. 4A and 4B are divided into four regions; namely, a software program (SP) region, a recording manager (RM) region, a volume manager (VM) region, and a monitor application (MA) region. Each of the regions denotes steps that the particular element (i.e., SP, RM, VM and MA) takes, including interactions between elements.

FIG. 4A depicts module interactions for recording programs. Referring to FIG. 4A, a software program SP requests a recording at step 410. The request is received and stored by the recording manager RM at step 420. If no volume is specified in the recording request, at step 421 the recording manager selects a default volume. At step 422 the RM checks to make sure that the application has rights to record on the volume. Information necessary to make this determination is provided, in one embodiment of the invention, by the volume manager VM providing access to control information for the volume at step 421.

At step 423, the RM verifies that quota and reservations for the one or more volumes to be used have not been violated. Information necessary to verify is provided by the volume manager at step 431, where quota and reservation information for the volume is provided. In one embodiment, the RM adds up the space used up by all recorded programs stored on a logical volume to make sure that any quota restrictions on that Logical volume are not exceeded. Similarly, if space is reserved on a Logical volume, the Recording Manager verifies that at least the reserved amount of space is always available on the volume to store television programs. When television programs are stored in a logical volume, the Recording Manager updates the available space on that volume based on the space already used up by the television programs.

At step 424, the RM takes corrective action if either the quota or reservations for the volume are violated. If corrective action is taken, then a notification of corrective action is communicated to the software program SP at step 411.

Where the application has rights (step 422) and both quota and reservations are not violated (step 423), the RM starts recording the television program or other content at the specified time (step 425). After starting a recording, a notification of recording start is communicated to the software program at step 412.

At step 426, the quotas and reservations are periodically verified by the RM to determine that they have not been violated. In the case of a violation, steps 424 and 411 are repeated. In the case of no violation, the recording of television programming or other content is stopped at a specified time (step 427), and notification about the recording stop is communicated to the SP (at step 413).

In one embodiment, the Recording Manager enforces the volume restrictions by periodically checking the space usage on all volumes to make sure none of the restrictions are violated. The checks for enforcing volume restriction may also be implemented on modules that write data on to storage devices. If the Recording Manager detects that any of the volume restrictions are about to be violated or are already violated, the Recording Manager takes corrective actions (424) to rectify the situation. Some examples of corrective actions include terminating the recording, deleting the recording that caused the violation, deleting one or more programs in the volume or volumes that exceeded the limit, or invoking a software function specified by one of the software programs to handle the situation.

FIG. 4B depicts module interactions for the location and management of a volume. At step 414, the software program SP requests the creation of one or more logical volumes. The logical volume(s) are to be created on any of the connected storage devices within, for example, the storage module 220. The request to create a new volume may specify a storage device, in which case the volume will be created on that storage device. If a storage device is not specified, the volume manager decides on which storage device to create the logical volume. In this case, the volume manager may create a logical volume that spans across multiple storage devices. At step 432, the volume manager receives a request and, at step 433, creates a logical volume if the software application has appropriate permissions.

The volume manager also propagates a notification of the creation of a new volume to the monitor application at step 440. The Monitor Application uses the Allocation Provisioning information to decide whether to set a quota value for the newly created volume. If a quota value has to be set, the Monitor Application gets the value for the quota from the Allocation Provisioning Information. Software programs may also request the Volume Manager to set a Quota for a Logical Volume.

At step 441, if the allocation provisioning information specifies setting quotas, the monitor application requests that a quota be set. The request is propagated to the volume manager. At step 434, the volume manager sets a quota for the created volume. At step 435, if the quota is being violated, programs are deleted to eliminate the violation.

At step 415, a software program requests reservations on a volume, which request is received by the volume manager at step 436. At step 437, the volume manager sends a request to the monitor application to check if the requested reservation should be granted. That is, software programs may request the Volume Manager to reserve a specified amount of storage space for the logical volume. When the Volume Manager receives such a request, the Volume Manager checks with the Monitor Application to see if the request should be allowed or denied. This check is performed via various methods. One such method is by invoking a software routine within the Monitor Application. Another method is to send a request to the Monitor Application to verify if the reservation request should be granted or not.

At step 442, if the allocation provisioning information allows such a reservation, the monitor application returns a value for the allowed space reservation (e.g., an amount of space for storage capacity). Upon receiving the request, the Monitor Application uses the Allocation Provisioning Information to decide whether the request should be granted or denied. For example if the request to reserve space originated from an application A, and if the Allocation Provisioning Information states that application A should be granted a reservation of up to 5 GB of space, the Monitor application should grant up to 5 GB of space reservation for the application. In one embodiment of the invention, the monitor application uses input from the user to decide how much space on a mass storage device should be granted for the application.

At step 438, the volume manager creates the appropriate reservation on a logical volume. While creating a Logical volume or any time after that, an application with sufficient access rights may optionally specify criteria to the Volume Manager for identifying software programs that should be allowed to store television programs on the Logical volume. The Recording Manager interfaces with the Volume Manager to gather information about these criteria. The Recording Manager prevents any software program that does not match the criteria to request television programs from being stored in the specified volume.

Allocation provisioning information may be provided in various forms. In one form, the reservation information allows any software programs to reserve any amount of space on any storage device and, if space is available in that device, to grant the reservation. In another form, the information identifies a set of software programs that are allowed to make reservations and the maximum value allowable for each software program. In this case the set of software programs may be specified as software programs with an associated attribute tag. The attribute tag associated with the software program may be transmitted or distributed along with the software program. The attribute tag for software programs may be transmitted separately to the PVR through an index table that includes entries for software programs and all attribute tags associated with the software program. In another form, the reservation information is a function of the storage space available on the PVR (e.g. percentage of total or available storage space), characteristics of the subscriber (e.g., premium or standard) of the PVR Service, or characteristics of the software program (e.g., preferred or standard) that requests the reservation. In another form, the information is retrieved from a server connected to the PVR through a communication network (e.g., server management of subscriber PVR).

When a volume is created or when a reservation is made, the monitor application may request the volume manager to add additional restrictions on the volume. The Monitor application could request the Volume manager to restrict the space usage on the volume to a given limit, or the Monitor application can impose limits on the set of applications that can access the Logical volume.

If a Monitor application is not active in a PVR implementing this system, the Volume Manager and the Recording Manager may assume the role and functionality of the Monitor Application. Even when the Volume Manager assumes the functionality of a monitor application, previously created volumes and reservations are not changed by the Volume Manager.

The Volume Manager gives a Monitor application the right (442) to change the values of any previously allowed reservation on any Logical Volume. These include adding more space to a reservation, removing space from a reservation, or deleting a reservation. A Monitor application can create a new Logical volume and reserve space on the Logical Volume and allow other applications to store television programs in the Logical Volume. The Monitor application may use reservation information to create such Logical Volumes and make reservation on Logical Volumes.

If a request to reserve space is made when the monitor application is not active, the Volume manager may grant (434) the request, provided space is taken away only from the default Logical volumes. When the monitor application gets control again, the monitor app may delete (444) the newly created logical volume or the reservation associated with it.

When a Logical volume is reduced in size (by the monitor application), the Volume manager deletes stored content if needed, to make sure that the Logical volume is not using more space than allowed.

If the PVR Service provider changes or if a new set of monitor applications are activated, a new monitor application could delete Logical volumes authorized by the earlier monitor application. A New Monitor application or a software program could set up one or more logical volume for reserved space. These requests will be approved by a module registered by the new monitor application.

When a new hard disk is inserted, the Volume Manager formats and hard partitions the disk to data and media partitions. The Volume Manager will make the newly added media space available to software programs to record television program. If a monitor application is active, the Volume manager notifies the monitor application about the availability of the new space. The monitor application could modify quota restrictions at this point.

Figure 5:
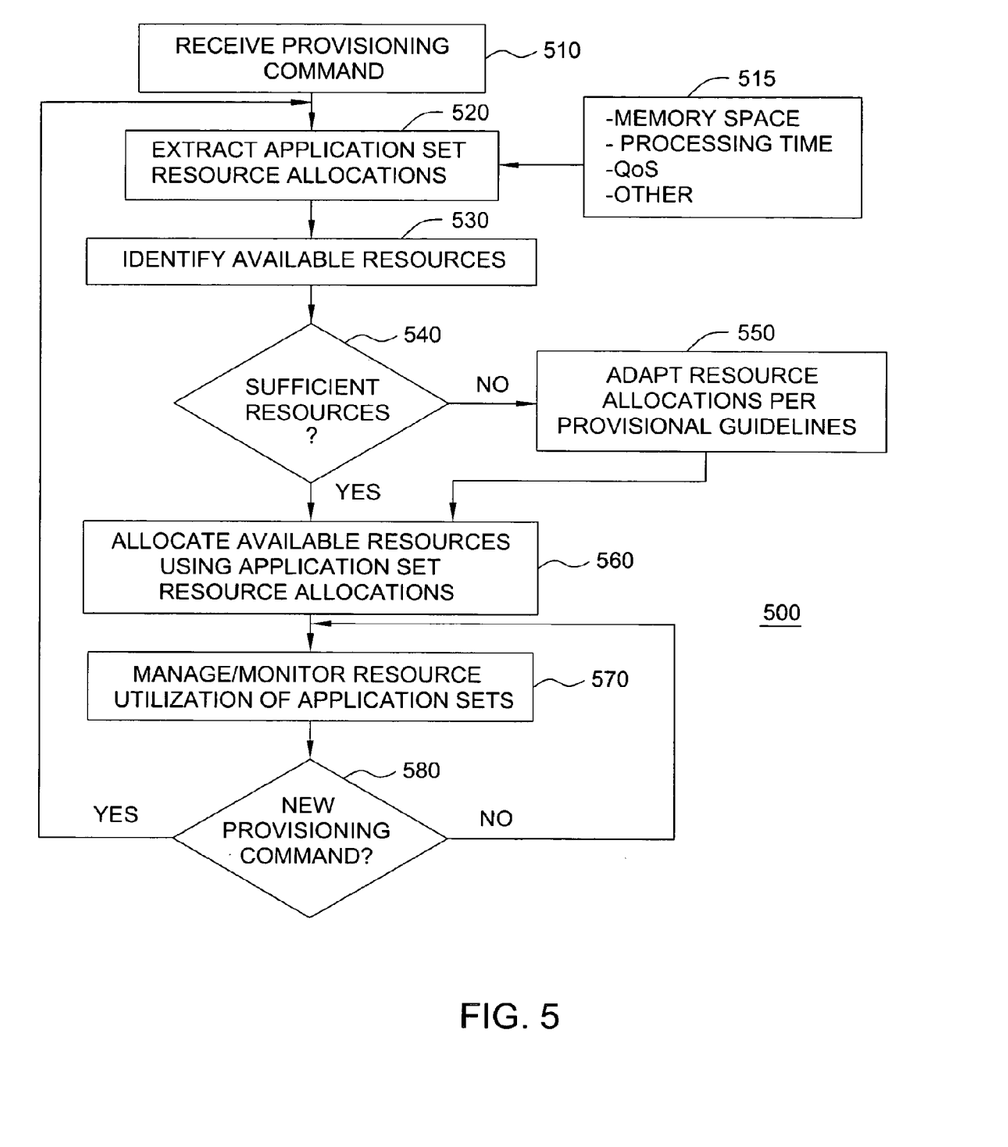
FIG. 5 depicts a flow diagram of a method according to an embodiment of the invention.

FIG. 5 depicts a flow diagram of a method according to an embodiment of the invention. Specifically, FIG. 5 depicts a flow diagram of a method according to an embodiment of the invention and suitable for use with the PVR of FIG. 2.

The method 500 of FIG. 5 is entered at step 510, when a provisioning command is received by the client device. At step 520, application set resource allocations are extracted from the provisioning command. That is, referring to box 515, resource allocations defined in terms of memory space, processing time, quality of service (QoS) and other criteria are extracted from the provisioning command. A provisioning command may be associated with an application or broadcast request.

At step 530, the available resources within the client device are identified and, at step 540, a determination is made as to whether sufficient resources exist to satisfy the extracted application set resource allocations. If insufficient resources exist, then at step 550 the resource allocations are adapted per the provisional guidelines. If the resources are sufficient (or the adaptation of the resources allocations has occurred per step 550), then at step 560 the available resources are allocated using the application set resource allocations as extracted from the provisioning command or as adapted per step 550.

At step 570, the method manages/monitors the resource utilization of the various application sets invoked within the client environment. At step 580, a determination is made as to whether a new provisioning command has been received. If a new command has not been received, then the method 500 continually manages/monitors resource utilization of the existing application set. If the new provisioning command has been received, then the method processes the new provisioning command by repeating steps 520 through 560 and then continues to manage/monitor resource utilization of the application sets at 570.

Figure 6:
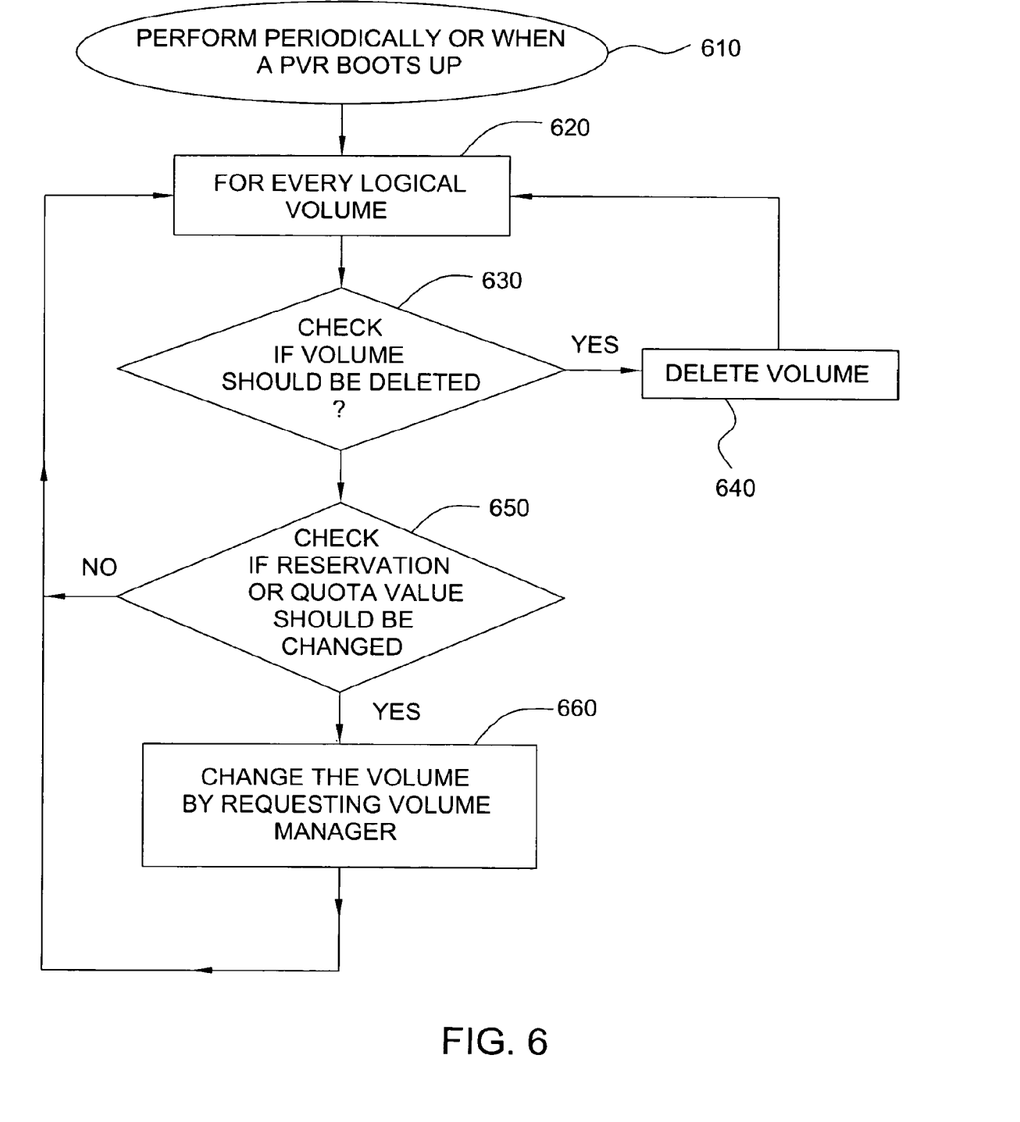
FIG. 6 depicts a flow diagram of a volume validation routine suitable for use by a monitor application in an embodiment of the present invention.

FIG. 6 depicts a flow diagram of a volume validation routine suitable for use by a monitor application in an embodiment of the present invention. Specifically, the monitor application volume validation method 600 of FIG. 6 is performed, per step 610, periodically (e.g., daily, weekly, or at some other interval) or when a PVR boots up (e.g., upon a power on or warm start).

Per step 620, the method 600 is performed for every logical volume. Thus, for a first iteration of the method a first logical volume is selected. The method 600 is exited when each logical volume has been processed.

At step 630, a determination is made as to whether the selected logical volume should be deleted. If the query at step 630 is answered affirmatively, then at step 640 the selected logical volume is deleted and the method returns to step 620 to select the next logical volume. If the query at step 630 is answered negatively, then at step 650 a query is made as to whether a reservation or quota value associated with the selected logical volume should be changed. If no such change is indicated, then the method proceeds to step 620 to select the next logical volume. Otherwise, at step 660 the reservation and/or quota value associated with the selected logical volume is changed by propagating a change request to the volume manager. The method then proceeds to step 620 where the next logical volume is selected.

Figure 7:
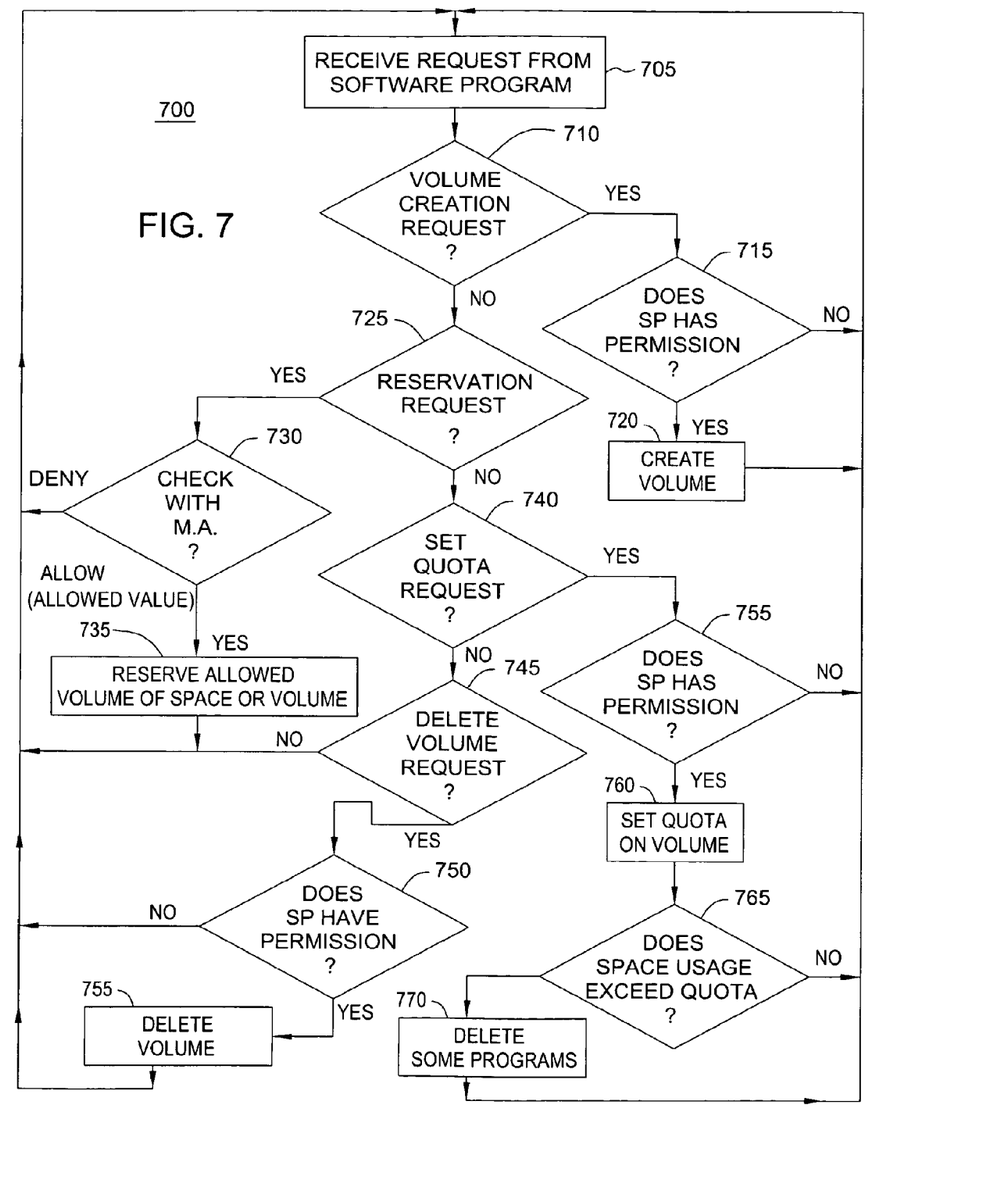
FIG. 7 depicts a flow diagram of a volume creation and maintenance routine suitable for use by a volume manager according to an embodiment of the present invention.

FIG. 7 depicts a flow diagram of a volume creation and maintenance routine suitable for use by a volume manager according to an embodiment of the present invention. The volume creation and maintenance method 700 of FIG. 7 is entered at step 705, when a request is received from a software program. At step 710, a determination is made as to whether the software program request comprises a volume creation request. If the request comprises a volume creation request, then at step 715 a determination is made as to whether the software program has permission to perform this task. If the software program does not have permission, then the method proceeds back to step 705 to await a next request. If the software program does have permission, then at step 720 the volume is created and the method 700 proceeds to step 705 to await the next request.

If the request is not a volume creation request, then at step 725 a query is made as to whether the request is a reservation request. If the software program has made a reservation request, then at step 730 the monitor application is queried to determine if the reservation request may be honored. If the monitor application denies the request, then the method 700 returns to step 705 to await the next request. If the monitor application allows the request, then at step 735 the allowed value of space is reserved on a volume, and the method 700 returns to step 705.

If, at step 725, a reservation request has not been received, then at step 740 a determination is made as to whether a set quota request has been received. If a set quota request has been received, then at step 755 a determination is made as to whether the software program has permission to effect such a request. If the software program does not have permission, then the method 700 returns to step 705. If the software program does have permission, then the method proceeds to step 760 where the quota on the volume is correspondingly set. At step 765, a query is made as to whether the space usage exceeds the quota. If the space usage does not exceed the quota, then the method returns to step 705. If the space usage does exceed the quota, then at step 770, some programs are deleted to insure that the space usage does not exceed the quota. The method then proceeds to step 705.

If, at step 740, a set quota request was not received, then at step 745 a query is made as to whether a delete volume request has been received. If a delete volume request has not been received, then the method 700 proceeds to step 705. If a delete volume request has been received, then at step 750 a determination is made as to whether the software program has permission to effect such a request. If the SP does have permission, then at step 755 the volume is delete and the method returns to step 705. If the SP does not have permission at step 750, then the method returns directly to step 705.

Figure 8:
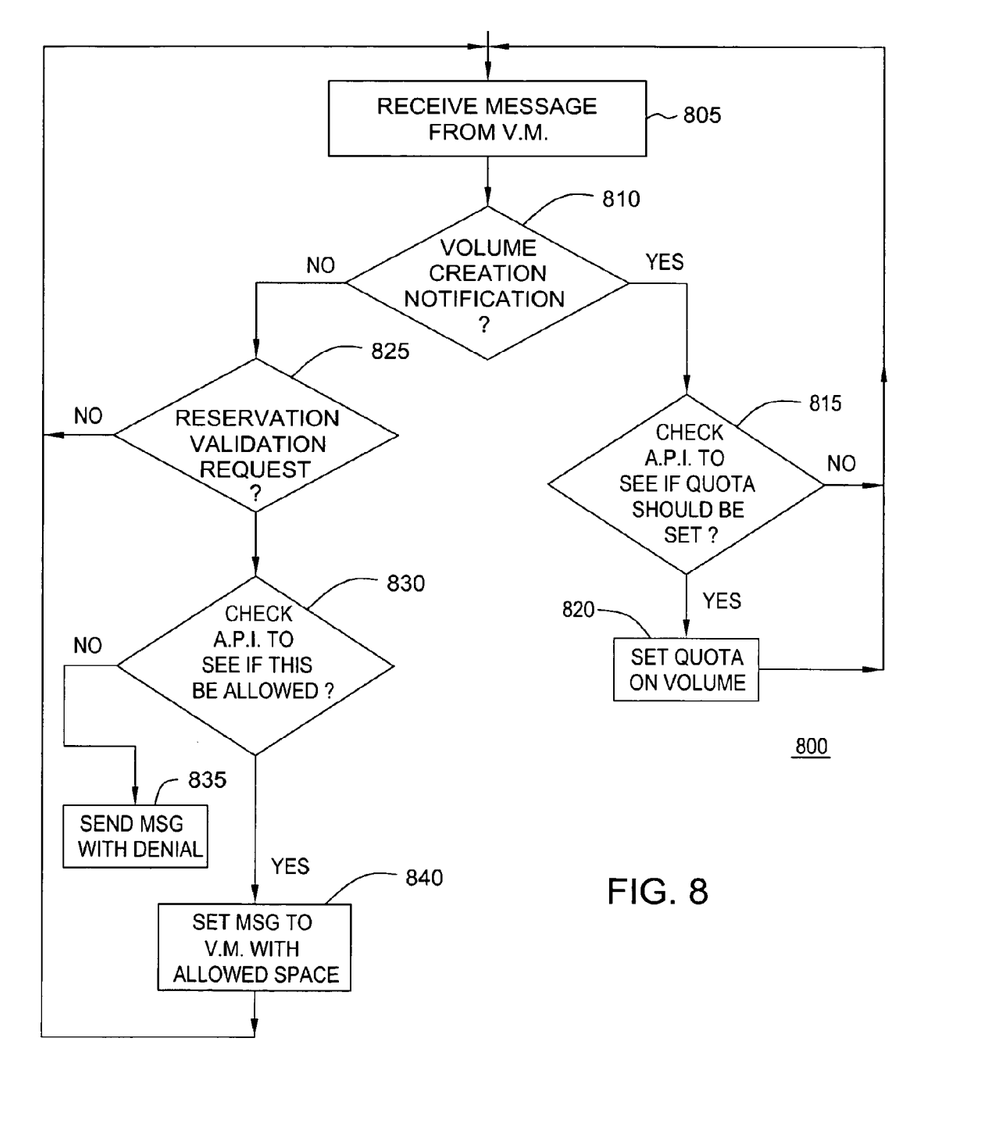
FIG. 8 depicts a flow diagram of a volume monitoring method suitable for use by a monitor application in an embodiment of the present invention.

FIG. 8 depicts a flow diagram of a volume monitoring method suitable for use by a monitor application in an embodiment of the present invention. Specifically, the method 800 of FIG. 8 is entered at step 805 when a monitoring application receives a message from a volume manager. At step 810, a determination is made as to whether the received message comprises a volume creation notification. If the received message comprises a volume creation notification, then at step 815 the application programming interface (API) is checked to determine if a quota should be set. If such a quota should be set, then at step 820 the quota is set for the volume. The method then proceeds to step 805 to await the next message.

If the received message is not a volume creation notification, then at step 825 a determination is made as to whether the received message comprises a reservation validation request. If not a reservation validation request, then the method 800 proceeds to step 805 to await the next message. Otherwise, the method proceeds to step 830, where the API is checked to determine if the reservation validation request is allowed. If not allowed, then at step 835 a denial message is transmitted and the method 800 proceeds to step 805. If allowed, then at step 840 a message to the volume manager is set indicating that the allowed space is provided, and the method 800 proceeds to step 805.

It will be appreciated by those skilled in the art and informed by the teachings of the present invention that the functionality of the Volume Manager, Recording Manager and/or Monitor Application may be distributed across various modules of a PVR. That is, any one or more of the receiver module 210, storage module 220, presentation module 230, and control module 240 may be used to perform some or all of these functions.

While the foregoing is directed to the preferred embodiment of the present invention, other and further embodiments of the invention may be devised without departing from the basic scope thereof, and the scope thereof is determined by the claims that follow.

What is claimed is:

1. A method comprising:
receiving, by a computing device in communication with a storage device, a request from a software program to reserve an amount of storage space on a logical volume comprising memory space from at least one physical partition on the storage device;
determining, by the computing device, that the software program is allowed to reserve the amount of storage space in accordance with allocation provisioning information defining a maximum amount of space the software program can reserve on the logical volume;
based at least in part on determining that the software program is allowed to reserve the amount of storage space, reserving the amount of storage space on the logical volume for the software program such that the amount of storage space is available to the software program for recording media content;
subsequent to reserving the amount of storage space, monitoring use of the logical volume to determine whether a quota has been violated, the quota specifying a maximum amount of space that can be used for storing media content on the logical volume, and the maximum amount of space that can be used for storing media content on the logical volume being different from the maximum amount of space the software program can reserve on the logical volume; and
responsive to determining that the quota has been violated, deleting at least one item of media content from the logical volume to eliminate the violation.

2. The method of claim 1, wherein the at least one physical partition comprises a media partition that is dedicated to storing media content and a data partition that is dedicated to storing data other than media content, wherein the logical volume comprises memory space from both the media partition and the data partition.

3. The method of claim 1, further comprising:
receiving, from the software program, a recording request indicating that the software program intends to schedule or start a recording of media content.

4. The method of claim 3, further comprising:
subsequent to receiving the recording request, determining whether the quota is violated, resulting in a determination that the quota is not violated; and
subsequent to the determination that the quota is not violated, performing the recording of media content.

5. The method of claim 1, wherein monitoring use of the logical volume to determine whether the quota has been violated comprises determining whether the maximum amount of space that can be used for storing media content on the logical volume has been exceeded.

6. The method of claim 1, further comprising:
creating the logical volume; and
subsequent to creating the logical volume, setting the quota on the logical volume.

7. The method of claim 1, wherein reserving the amount of storage space on the logical volume for the software program creates a reservation specifying the amount of storage space, and wherein the method further comprises:
determining whether the reservation should be changed, wherein determining whether the reservation should be changed is performed according to at least one of a periodic interval or during a boot up of the computing device; and responsive to determining that the reservation should be changed, changing the reservation.

8. The method of claim 1, further comprising:

receiving, from the software program, a volume creation request specifying the logical volume;

determining that the software program has permission to create the logical volume; and responsive to determining that the software program has permission to create the logical volume, creating the logical volume.

9. A method comprising:

receiving, by a computing device in communication with one or more storage devices, a request from a software program to reserve an amount of storage space on a logical volume comprising memory space from two or more physical partitions of the one or more storage devices;

determining, by the computing device, that the software program is allowed to reserve the amount of storage space in accordance with allocation provisioning information defining a maximum amount of space the software program can reserve on the logical volume;

based at least in part on determining that the software program is allowed to reserve the amount of storage space, reserving the amount of storage space on the logical volume for the software program such that the amount of storage space is available to the software program for recording media content;

subsequent to reserving the amount of storage space, monitoring use of the logical volume to determine whether a quota has been violated, the quota specifying a maximum amount of space that can be used for storing media content on the logical volume, and the maximum amount of space that can be used for storing media content on the logical volume being different from the maximum amount of space the software program can reserve on the logical volume; and responsive to determining that the quota has been violated, deleting at least one item of media content from the logical volume to eliminate the violation.

10. The method of claim 9, wherein the two or more physical partitions comprises a media partition that is dedicated to storing media content and a data partition that is dedicated to storing data other than media content, wherein the logical volume comprises memory space from both the media partition and the data partition.

11. The method of claim 9, further comprising:

receiving, from the software program, a recording request indicating that the software program intends to schedule or start a recording of media content;

subsequent to receiving the recording request, determining whether the quota is violated, resulting in a determination that the quota is not violated; and subsequent to the determination that the quota is not violated, performing the recording of media content.

12. The method of claim 9, wherein monitoring use of the logical volume to determine whether the quota has been violated comprises determining whether the maximum amount of space that can be used for storing media content on the logical volume has been exceeded.

13. The method of claim 9, wherein reserving the amount of storage space on the logical volume for the software program creates a reservation specifying the amount of storage space, and wherein the method further comprises:

determining whether the reservation should be changed, wherein determining whether the reservation should be changed is performed according to at least one of a periodic interval or during a boot up of the computing device; and responsive to determining that the reservation should be changed, changing the reservation.

14. The method of claim 9, further comprising:

receiving, from the software program, a volume creation request specifying the logical volume;

determining that the software program has permission to create the logical volume; and responsive to determining that the software program has permission to create the logical volume, creating the logical volume.

15. A method comprising:

receiving, by a personal video recorder (PVR) in communication with one or more storage devices, a request from a software program to reserve an amount of storage space on a logical volume comprising memory space from one or more physical partitions of the one or more storage devices;

determining, by the PVR, that the software program is allowed to reserve the amount of storage space in accordance with allocation provisioning information defining a maximum amount of space the software program can reserve on the logical volume;

based at least in part on determining that the software program is allowed to reserve the amount of storage space, reserving the amount of storage space on the logical volume for the software program such that the amount of storage space is available to the software program for recording media content;

subsequent to reserving the amount of storage space, monitoring use of the logical volume to determine whether a quota has been violated, the quota specifying a maximum amount of space that can be used for storing media content on the logical volume, and the maximum amount of space that can be used for storing media content on the logical volume being different from the maximum amount of space the software program can reserve on the logical volume; and responsive to determining that the quota has been violated, deleting at least one item of media content from the logical volume to eliminate the violation.

16. The method of claim 15, wherein the one or more physical partitions comprise a media partition that is dedicated to storing media content and a data partition that is dedicated to storing data other than media content, wherein the logical volume comprises memory space from both the media partition and the data partition.

17. The method of claim 15, further comprising:

receiving, from the software program, a recording request indicating that the software program intends to schedule or start a recording of media content;

subsequent to receiving the recording request, determining whether the quota is violated, resulting in a determination that the quota is not violated; and subsequent to the determination that the quota is not violated, performing the recording of media content.

18. The method of claim 15, wherein monitoring use of the logical volume to determine whether the quota has been violated comprises determining whether the maximum amount of space that can be used for storing media content on the logical volume has been exceeded.

19. The method of claim 15, wherein reserving the amount of storage space on the logical volume for the software program creates a reservation specifying the amount of storage space, and wherein the method further comprises:
- determining whether the reservation should be changed, wherein determining whether the reservation should be changed is performed according to at least one of a periodic interval or during a boot up of the PVR; and
- responsive to determining that the reservation should be changed, changing the reservation.

20. The method of claim 15, further comprising:
- receiving, from the software program, a volume creation request specifying the logical volume;
- determining that the software program has permission to create the logical volume; and
- responsive to determining that the software program has permission to create the logical volume, creating the logical volume.

* * * * *